United States Patent
Yazawa

(10) Patent No.: US 11,508,521 B2
(45) Date of Patent: Nov. 22, 2022

(54) METAL TERMINAL-EQUIPPED ELECTRONIC COMPONENT AND METHOD FOR PRODUCING METAL TERMINAL-EQUIPPED ELECTRONIC COMPONENT

(71) Applicant: TDK CORPORATION, Tokyo (JP)

(72) Inventor: Kosuke Yazawa, Tokyo (JP)

(73) Assignee: TDK CORPORATION, Tokyo (JP)

(*) Notice: Subject to any disclaimer, the term of this patent is extended or adjusted under 35 U.S.C. 154(b) by 0 days.

(21) Appl. No.: 17/371,778

(22) Filed: Jul. 9, 2021

(65) Prior Publication Data

US 2022/0013289 A1  Jan. 13, 2022

(30) Foreign Application Priority Data

Jul. 13, 2020 (JP) .............................. JP2020-119990

(51) Int. Cl.
  *H01G 4/228* (2006.01)
  *H01G 4/30* (2006.01)
  *H01G 4/232* (2006.01)
  *H01G 2/06* (2006.01)

(52) U.S. Cl.
  CPC .............. *H01G 4/228* (2013.01); *H01G 2/06* (2013.01); *H01G 4/232* (2013.01); *H01G 4/30* (2013.01)

(58) Field of Classification Search
  CPC .............................. H01G 4/232; H01G 4/228
  See application file for complete search history.

(56) References Cited

U.S. PATENT DOCUMENTS

2017/0076863 A1* 3/2017 Park ................... H01G 4/2325
2017/0207025 A1* 7/2017 Kim ..................... H01G 4/012

FOREIGN PATENT DOCUMENTS

JP       S63-187320 A    11/1988
JP       2003017302 A  * 1/2003

* cited by examiner

Primary Examiner — Eric W Thomas
(74) Attorney, Agent, or Firm — Oliff PLC

(57) ABSTRACT

A metal terminal-equipped electronic component includes: an electronic component having a terminal electrode; a conductive cloth member joined to the terminal electrode as a metal terminal; and a cushioning member supporting the electronic component and the cloth member, in which the cloth member is joined to at least a mounting surface of the cushioning member and a joint surface of the cushioning member to which the electronic component is joined, and the terminal electrode of the electronic component is joined to the cloth member on the joint surface of the cushioning member.

6 Claims, 4 Drawing Sheets

METAL TERMINAL-EQUIPPED ELECTRONIC COMPONENT AND METHOD FOR PRODUCING METAL TERMINAL-EQUIPPED ELECTRONIC COMPONENT

CROSS REFERENCE TO RELATED APPLICATIONS

This application claims priority to Japanese Patent Application No. 2020-119990 filed on Jul. 13, 2020, the entire contents of which are incorporated by reference herein.

TECHNICAL FIELD

The present disclosure relates to a metal terminal-equipped electronic component and a method for producing a metal terminal-equipped electronic component.

BACKGROUND

In the related art, the electronic component that is described in Japanese Unexamined Utility Model Publication No. S63-187320 is known as a metal terminal-equipped electronic component. The metal terminal-equipped electronic component includes an electronic component, a metal terminal joined to the terminal electrode of the electronic component, and a cushioning member supporting the electronic component and the metal terminal.

SUMMARY

The metal terminal-equipped electronic component includes the cushioning member. Accordingly, the cushioning member is capable of absorbing stress attributable to deflection with the metal terminal-equipped electronic component mounted on a substrate. On the other hand, it has been required to further improve the deflection resistance of the metal terminal-equipped electrode.

An object of the present disclosure is to provide a metal terminal-equipped electronic component capable of improving deflection resistance and a method for producing the metal terminal-equipped electronic component.

The metal terminal-equipped electronic component according to the present disclosure includes: an electronic component having a terminal electrode; a conductive cloth member joined to the terminal electrode as a metal terminal; and a cushioning member supporting the electronic component and the cloth member, in which the cloth member is joined to at least a mounting surface of the cushioning member and a joint surface of the cushioning member to which the electronic component is joined, and the terminal electrode of the electronic component is joined to the cloth member on the joint surface of the cushioning member.

The metal terminal-equipped electronic component according to the present disclosure includes the cushioning member supporting the electronic component and the cloth member. Since the cushioning member supports the electronic component in this manner, the cushioning member is capable of absorbing stress attributable to deflection with the metal terminal-equipped electronic component mounted on a substrate. Here, the metal terminal-equipped electronic component includes the conductive cloth member joined to the terminal electrode as the metal terminal. The cloth member is more flexible than a metal terminal formed by a metal piece being bent. Accordingly, the cloth member can be easily bent with respect to deflection. The cloth member is joined to at least the mounting surface of the cushioning member and the joint surface of the cushioning member to which the electronic component is joined, and the terminal electrode of the electronic component is joined to the cloth member on the joint surface of the cushioning member. Accordingly, the cloth member is capable of electrically connecting the terminal electrode of the electronic component joined on the joint surface side and the terminal of the substrate joined on the mounting surface side. In addition, the flexible cloth member is supported by the cushioning member, and thus it is possible to maintain the posture in which the terminal electrode of the electronic component and the terminal of the substrate are electrically connected. In other words, the cloth member is capable of sufficiently functioning as the metal terminal while improving deflection resistance. From the above, the metal terminal-equipped electronic component is capable of improving deflection resistance.

The cushioning members may be separated from each other as a pair of members. In this case, the joining structure of the cushioning member and one terminal electrode of the electronic component is capable of being independent of the joining structure of the cushioning member and the other terminal electrode of the electronic component. Accordingly, the deflection resistance can be further improved as compared with a case where a cushioning member integrated with the pair of terminal electrodes of the electronic component is provided.

The cloth member may be joined so as to bite into the cushioning member. In this case, the cloth member and the cushioning member can be firmly joined, and thus poor contact can be suppressed.

The cloth member may surround the cushioning member in a U-shaped cross section when viewed from a direction parallel to the mounting surface. In this case, it is possible to reliably connect the terminal electrode of the electronic component and the terminal of the substrate with a small amount of metal cloth by keeping the cloth member supported by the cushioning member within a required range.

The cloth member may surround the cushioning member in a square cross section when viewed from a direction parallel to the mounting surface. In this case, the cloth member is supported in a state where the cushioning member is wrapped around the entire circumference when viewed from the direction parallel to the mounting surface, and thus electrical conductivity can be ensured with greater reliability. For example, although the stress attributable to deflection easily has an effect in a case where a metal piece surrounds the entire circumference of the cushioning member, the cloth member has flexibility, and thus it is possible to improve the deflection resistance while ensuring the electrical conductivity.

The cloth member may have a mesh-shaped gap. In this case, solder enters the mesh-shaped gap when the terminal electrode of the electronic component is joined to the cloth member and connectivity can be improved as a result. In addition, when the cloth member is joined to the cushioning member by thermocompression bonding, the cloth member and the cushioning member can be firmly joined by the molten cushioning member entering the mesh-shaped gap. In addition, heat can be easily transferred to the cloth member, and thus the joining between the cloth member and the cushioning member is facilitated.

The method for producing a metal terminal-equipped electronic component according to the present disclosure includes: preparing an electronic component having a terminal electrode; preparing a conductive cloth member to be joined to the terminal electrode as a metal terminal; preparing a cushioning member supporting the electronic component and the cloth member; joining the cloth member by thermocompression bonding to at least a mounting surface of the cushioning member and a joint surface of the cushioning member to which the electronic component is joined; and joining the terminal electrode of the electronic component to the cloth member on the joint surface of the cushioning member.

According to the method for producing a metal terminal-equipped electronic component according to the present disclosure, it is possible to improve the deflection resistance of the metal terminal-equipped electronic component using the same action and effect as those of the metal terminal-equipped electronic component described above. In addition, the cloth member is joined by thermocompression bonding to the cushioning member in joining the cloth member to the cushioning member. In this case, the molten material of the cushioning member enters the cloth member and the two can be firmly joined as a result. In addition, the cloth member and the cushioning member can be joined without solidifying solder being used, and thus it is possible to maintain a state where the cloth member exhibits flexibility and the deflection resistance can be improved.

According to the present disclosure, it is possible to provide a metal terminal-equipped electronic component capable of improving deflection resistance and a method for producing the metal terminal-equipped electronic component.

DETAILED DESCRIPTION

Figure 1:
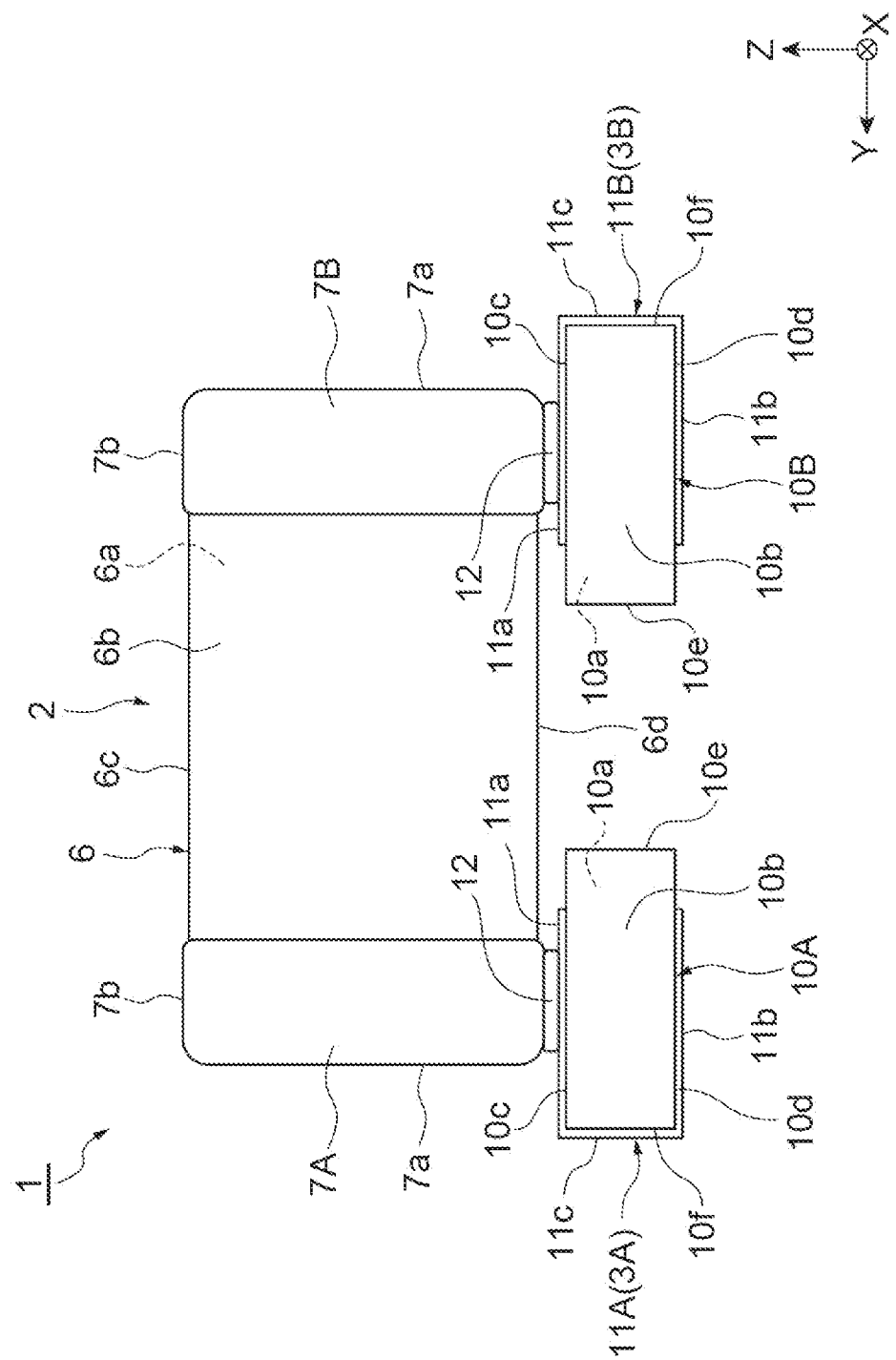
FIG. 1 is a front view of a metal terminal-equipped electronic component according to an embodiment of the present disclosure.

The structure of a metal terminal-equipped electronic component according to an embodiment of the present disclosure will be described with reference to FIG. 1. FIG. 1 is a front view of the metal terminal-equipped electronic component.

As illustrated in FIG. 1, a metal terminal-equipped electronic component 1 includes an electronic component 2, a pair of cushioning members 10A and 10B, and a pair of cloth members 11A and 11B configured as a pair of metal terminals 3A and 3B. It should be noted that the XYZ coordinates in the drawings may be used in the following description. The Z axis coincides with the height direction of the electronic component 2 from a mounting surface. The X axis extends in a direction perpendicular to the Z-axis direction. The Y axis extends in the direction that is perpendicular to the X-axis direction and the Z-axis direction. It should be noted that one side in the X-axis direction and the Y-axis direction is set to the positive side and the upper side in the Z-axis direction is set to the positive side.

The electronic component 2 includes an element body 6 and a pair of terminal electrodes 7A and 7B. The element body 6 has a substantially rectangular parallelepiped shape. The element body 6 includes side surfaces 6a and 6b extending in parallel to the YZ plane on the positive and negative sides in the X-axis direction, side surfaces 6c and 6d extending in parallel to the XY plane on the positive and negative sides in the Z-axis direction, and end surfaces (not illustrated) extending in parallel to the XZ plane on the positive and negative sides in the Y-axis direction. The side surface 6a of the electronic component 2 on the negative side in the X-axis direction and the side surface 6b of the electronic component 2 on the positive side in the X-axis direction are disposed so as to face each other in the X-axis direction. The terminal electrode 7A is provided so as to cover the end surface of the element body 6 on the positive side in the Y-axis direction. The terminal electrode 7B is provided so as to cover the end surface of the element body 6 on the negative side in the Y-axis direction. In addition, the terminal electrodes 7A and 7B wrap around to the side surfaces 6a, 6b, 6c, and 6d. Accordingly, the terminal electrodes 7A and 7B have main body portions 7a covering the end surfaces of the element body 6 in the Y-axis direction and wrap-around portions 7b wrapping around to the side surfaces 6a, 6b, 6c, and 6d.

In the present embodiment, the electronic component 2 is configured as a capacitor. Accordingly, a plurality of internal electrode layers are stacked across a dielectric layer in the element body 6 and the internal electrode layer connected to the terminal electrode 7A and the internal electrode layer connected to the terminal electrode 7B are alternately stacked. The shape and size of the electronic component 2 may be appropriately determined depending on the purpose and application. For example, the electronic component 2 is approximately 1.0 to 10.0 mm in length (dimension in the Y-axis direction), approximately 0.5 to 8.0 mm in width (dimension in the Z-axis direction), and approximately 0.3 to 5.0 mm in thickness (dimension in the X-axis direction).

The material of the dielectric layer of the electronic component 2 is not particularly limited. For example, the dielectric layer of the electronic component 2 is made of a dielectric material such as calcium titanate, strontium titanate, barium titanate, or a mixture thereof. Although the conductor material contained in the internal electrode layer is not particularly limited, a relatively inexpensive base metal can be used in a case where the constituent material of the dielectric layer has reduction resistance. Ni or a Ni alloy is preferable as the base metal. An alloy of Ni and one or more elements selected from Mn, Cr, Co, and Al is preferable as the Ni alloy, and it is preferable that the alloy has a Ni content of 95 wt % or more. It should be noted that the Ni alloy or Ni may contain approximately 0.1 wt % or less of various trace components such as P. In addition, the internal electrode layer may be formed by commercially available electrode paste being used. The thickness of the internal electrode layer may be appropriately determined depending on the application and so on. The materials of the terminal electrodes 7A and 7B are not particularly limited, either. Although copper, a copper alloy, nickel, a nickel alloy, or the like is usually used, silver, a silver-palladium alloy, and so on can also be used. A metal coating of at least one selected from Ni, Cu, Sn, and so on may be formed on the surfaces of the terminal electrodes 7A and 7B.

The cushioning members 10A and 10B are disposed between a substrate as an object of mounting and the electronic component 2. The cushioning members 10A and 10B are capable of absorbing the stress that is attributable to deflection and transmitted from the substrate to the electronic component 2. In addition, the cushioning members 10A and 10B support the electronic component 2 and the cloth members 11A and 11B. The material of the cushioning members 10A and 10B is not particularly limited insofar as the material is capable of absorbing the stress from the substrate. A resin material, plastic, a rubber material, and so on may be adopted as the material. Specifically, silicon rubber, epoxy, and so on may be adopted as the material.

The cushioning members 10A and 10B are separated from each other as a pair of members. The cushioning member 10A supports the electronic component 2 at the position of the terminal electrode 7A. The cushioning member 10B supports the electronic component 2 at the position of the terminal electrode 7B. The cushioning members 10A and 10B support the electronic component 2 on the positive side in the Z-axis direction, that is, the side opposite to mounting surfaces 10d to be described later. As a result, the cushioning members 10A and 10B support the electronic component 2 at positions higher than the mounting surfaces 10d. The cushioning members 10A and 10B are disposed apart from each other in the Y-axis direction.

The cushioning members 10A and 10B have a rectangular parallelepiped shape. The cushioning members 10A and 10B include side surfaces 10a and 10b extending in parallel to the YZ plane on the positive and negative sides in the X-axis direction, joint surfaces 10c and the mounting surfaces 10d extending in parallel to the XY plane on the positive and negative sides in the Z-axis direction, and side surfaces 10e and 10f extending in parallel to the XZ plane on the inner side (middle side) and the outer sides (sides opposite to the middle position) in the Y-axis direction.

The joint surface 10c of the cushioning member 10A is a surface to which the terminal electrode 7A of the electronic component 2 is joined. The joint surface 10c of the cushioning member 10B is a surface to which the terminal electrode 7B of the electronic component 2 is joined. The mounting surfaces 10d of the cushioning members 10A and 10B are surfaces mounted on the substrate. The side surfaces 10e of the cushioning members 10A and 10B on the inner side in the Y-axis direction are disposed inside the terminal electrodes 7A and 7B. The side surfaces 10f of the cushioning members 10A and 10B on the outer sides in the Y-axis direction are disposed outside the terminal electrodes 7A and 7B. It should be noted that the side surfaces 10a of the cushioning members 10A and 10B on the positive side in the X-axis direction are disposed closer to the positive side than the terminal electrodes 7A and 7B and the side surfaces 10b of the cushioning members 10A and 10B on the negative side in the X-axis direction are disposed closer to the negative side than the terminal electrodes 7A and 7B. However, the cushioning members 10A and 10B are not particularly limited in size and disposition with respect to the electronic component 2.

The cloth members 11A and 11B are conductive cloths. The cloth members 11A and 11B constitute the metal terminals 3A and 3B by being joined to the cushioning members 10A and 10B. The cloth members 11A and 11B are members formed by fiber knitting. A metal cloth, a conductive cloth, and so on may be adopted as the cloth members 11A and 11B. The metal cloth is a member configured by a metallic fiber being knitted. A 42 alloy, copper, and so on are adopted as the material of the metallic fiber of the metal cloth. The conductive cloth is a member configured by a conductive plating layer being formed on the surface of a cloth after the cloth is configured by a non-metallic fiber being knitted. For example, copper, nickel, and so on are adopted as the material of the fiber of the conductive cloth. For example, tin, nickel, and so on are adopted as the material of the plating layer on the surface.

The cloth members 11A and 11B are joined to the mounting surfaces 10d, the joint surfaces 10c, and the side surfaces 10f of the cushioning members 10A and 10B. As a result, the cloth members 11A and 11B surround the cushioning members 10A and 10B in a U-shaped cross section when viewed from the X-axis direction. The cloth members 11A and 11B have joint portions 11a, mounting portions 11b, and connecting portions 11c. The cloth members 11A and 11B may extend in the X-axis direction with the size that is equal to the dimension of the cushioning member 10 in the X-axis direction or may be smaller than the dimension of the cushioning member 10 in the X-axis direction.

The joint portion 11a is a part extending in parallel to the joint surface 10c by being joined to the joint surface 10c. As a result, the joint portion 11a extends along the joint surface 10c so as to cover the joint surface 10c. The joint portion 11a extends inward in the Y-axis direction from the side surface 10f and extends to a position on the side surface 10e side as compared with the middle. The joint portion 11a extends inward in the Y-axis direction beyond the terminal electrode 7A. The joint portion 11a is joined to the terminal electrode 7A in a state of being supported by the joint surface 10c. The joint portion 11a is joined to the wrap-around portion 7b of the terminal electrode 7A via a joining material 12. The joining material 12 is made of solder.

The mounting portion 11b is a part extending in parallel to the mounting surface 10d by being joined to the mounting surface 10d. As a result, the mounting portion 11b extends along the mounting surface 10d so as to cover the mounting surface 10d. The mounting portion 11b extends inward in the Y-axis direction from the side surface 10f and extends to a position on the side surface 10e side as compared with the middle. The mounting portion 11b extends inward in the Y-axis direction beyond the terminal electrode 7A and extends to the same position as the joint portion 11a. The mounting portion 11b is connected to the terminal of the substrate via solder when the metal terminal-equipped electronic component 1 is mounted on the substrate.

The connecting portion 11c is a part extending in parallel to the side surface 10f by being joined to the side surface 10f. The connecting portion 11c extends so as to cover the entire side surface 10f in the Z-axis direction. As a result, the connecting portion 11c extends along the side surface 10f so as to cover the side surface 10f. The connecting portion 11c connects the joint portion 11a and the mounting portion 11b by being connected to end portions of the joint portion 11a and the mounting portion 11b in the Y-axis direction.

The cloth members 11A and 11B are configured by fiber knitting and thus have mesh-shaped gaps. The joint portion 11a and the mounting portion 11b allow solder to soak into the mesh-shaped gaps.

Figure 2:
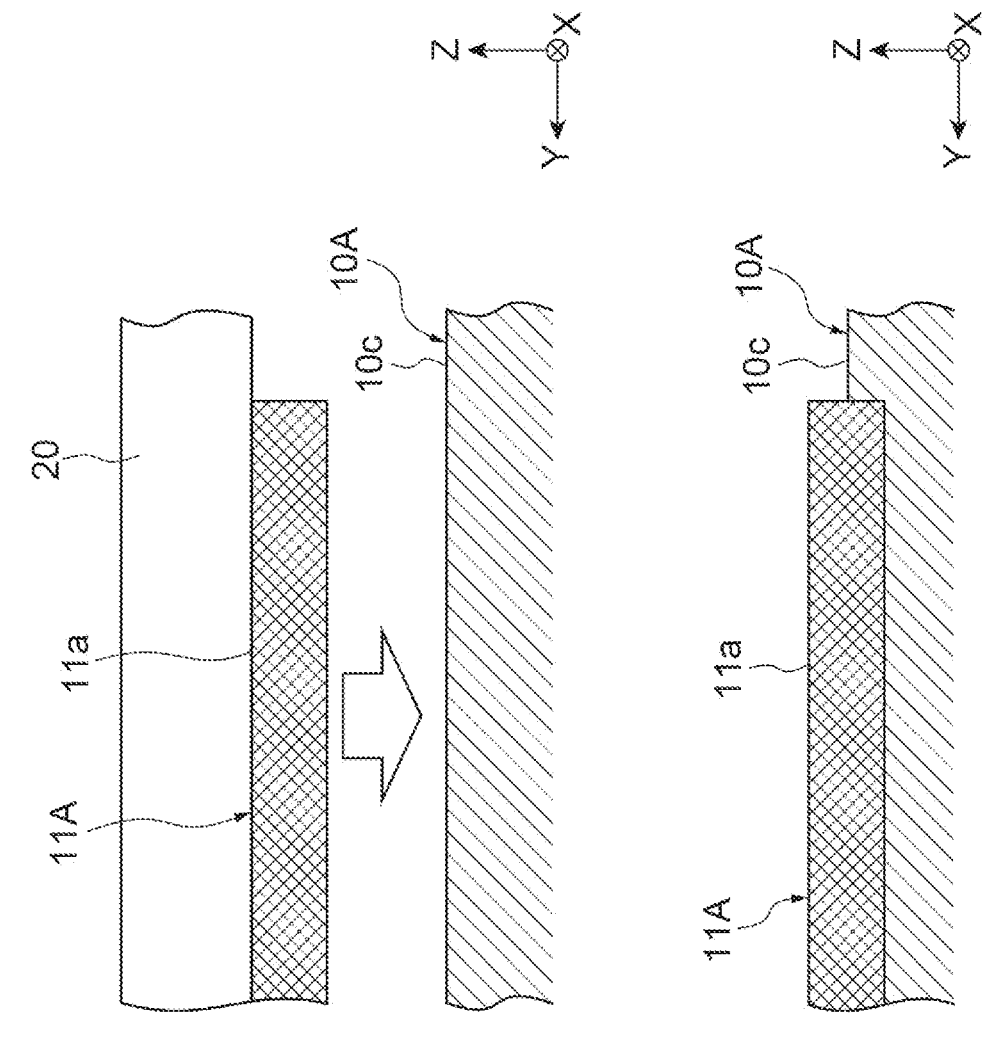
FIGS. 2A and 2B are conceptual diagrams illustrating how a cloth member is joined to a cushioning member.

As illustrated in FIG. 2B, the cloth member 11A is joined so as to bite into the cushioning member 10A. The cloth member 11A is joined to the joint surface 10c in a state of being sunk to the inner side of the cushioning member 10A (negative side in the Z-axis direction) beyond the joint surface 10c. The cloth member 11A is joined to the joint surface 10c by thermocompression bonding. Accordingly, the material in the vicinity of the joint surface 10c of the cushioning member 10A melts in part and soaks into the mesh-shaped gap of the cloth member 11. It should be noted that the mounting portion 11b and the connecting portion 11c are also connected so as to bite into the cushioning member 10A although the state of the vicinity of the joint portion 11a of the cloth member 11A is illustrated in FIG. 2B. The same applies to the cloth member 11B.

Figure 3:
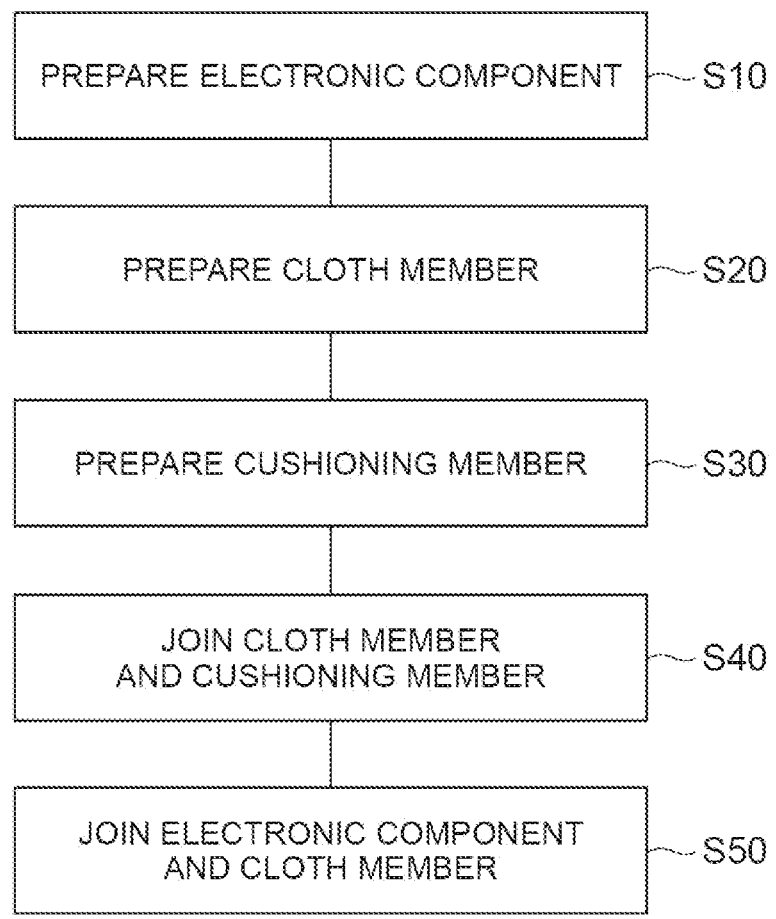
FIG. 3 is a process diagram illustrating a method for producing the metal terminal-equipped electronic component according to the present embodiment.

Next, a method for producing the metal terminal-equipped electronic component 1 according to the present embodiment will be described with reference to FIG. 3. FIG. 3 is a process diagram illustrating the method for producing the metal terminal-equipped electronic component 1 according to the present embodiment.

As illustrated in FIG. 3, Step S10 of preparing the electronic component 2 having the terminal electrodes 7A and 7B is executed first. Next, Step S20 of preparing the conductive cloth members 11A and 11B to be joined to the terminal electrodes 7A and 7B as the metal terminals 3A and 3B is executed. Next, Step S30 of preparing the cushioning members 10A and 10B supporting the electronic component 2 and the cloth members 11A and 11B is executed.

Executed next is Step S40 of joining the cloth members 11A and 11B by thermocompression bonding to the mounting surfaces 10d, the joint surfaces 10c, and the side surfaces 10f of the cushioning members 10A and 10B. In Step S40, the joint portion 11a of the cloth member 11A is pressed against the joint surface 10c while being heated by means of a heating pressing tool 20 as illustrated in FIG. 2A. As a result, the material of the cushioning member 10A near the joint surface 10c melts and enters the mesh-shaped gap of the cloth member 11A. In addition, the cloth member 11A is pushed and bites into the cushioning member 10A. The cushioning member 10 that has entered the cloth member 11A is cured when the heating pressing tool 20 is separated. As a result, the cloth member 11A is fixed to the cushioning member 10A with the cushioning member 10A bitten. The heating pressing tool 20 joins the cloth member 11A to the mounting surface 10d and the joint surface 10c as well. The cloth member 11B is also joined to the cushioning member 10B by the same method.

Executed next is Step S50 of joining the terminal electrodes 7A and 7B of the electronic component 2 to the cloth members 11A and 11B on the joint surfaces 10c of the cushioning members 10A and 10B. In Step S50, the molten joining materials 12 are applied onto the joint portions 11a of the cloth members 11A and 11B and the terminal electrodes 7A and 7B are placed on the joint portions 11a of the cloth members 11A and 11B via the joining materials 12, respectively. As a result, the cloth members 11A and 11B and the terminal electrodes 7A and 7B are joined by the joining materials 12 being cured.

Next, the actions and effects of the metal terminal-equipped electronic component 1 according to the present embodiment and the method for producing the metal terminal-equipped electronic component 1 according to the present embodiment will be described.

The metal terminal-equipped electronic component 1 according to the present embodiment includes the cushioning members 10A and 10B supporting the electronic component 2 and the cloth members 11A and 11B. Since the cushioning members 10A and 10B support the electronic component 2 in this manner, the cushioning members 10A and 10B are capable of absorbing the stress attributable to deflection with the metal terminal-equipped electronic component 1 mounted on the substrate. Here, the metal terminal-equipped electronic component 1 includes the conductive cloth members 11A and 11B joined to the terminal electrodes 7A and 7B as the metal terminals 3A and 3B. The cloth members 11A and 11B are more flexible than a metal terminal formed by a metal piece being bent. Accordingly, the cloth members 11A and 11B can be easily bent with respect to deflection. The cloth members 11A and 11B are joined to at least the mounting surfaces 10d of the cushioning members 10A and 10B and the joint surfaces 10c of the cushioning members 10A and 10B to which the electronic component 2 is joined, and the terminal electrodes 7A and 7B of the electronic component 2 are joined to the cloth members 11A and 11B on the joint surfaces 10c of the cushioning members 10A and 10B. Accordingly, the cloth members 11A and 11B are capable of electrically connecting the terminal electrodes 7A and 7B of the electronic component 2 joined on the joint surface 10c side and the terminals of the substrate joined on the mounting surface 10d side. In addition, the flexible cloth members 11A and 11B are supported by the cushioning members 10A and 10B, and thus it is possible to maintain the posture in which the terminal electrodes 7A and 7B of the electronic component 2 and the terminals of the substrate are electrically connected. In other words, the cloth members 11A and 11B are capable of sufficiently functioning as the metal terminals 3A and 3B while improving deflection resistance. From the above, the metal terminal-equipped electronic component 1 is capable of improving deflection resistance.

The cushioning members 10A and 10B may be separated from each other as a pair of members. In this case, the joining structure of the cushioning member 10A and the terminal electrode 7A of the electronic component 2 is capable of being independent of the joining structure of the cushioning member 10B and the terminal electrode 7B of the electronic component 2. Accordingly, the deflection resistance can be further improved as compared with a case where a cushioning member integrated with the pair of terminal electrodes 7A and 7B of the electronic component 2 is provided.

The cloth members 11A and 11B may be joined so as to bite into the cushioning members 10A and 10B. In this case, the cloth members 11A and 11B and the cushioning members 10A and 10B can be firmly joined, and thus poor contact can be suppressed.

The cloth members 11A and 11B may surround the cushioning members 10A and 10B in a U-shaped cross section when viewed from the (X-axis) direction parallel to the mounting surface 10d. In this case, it is possible to reliably connect the terminal electrodes 7A and 7B of the electronic component 2 and the terminals of the substrate with a small amount of metal cloth by keeping the cloth members 11A and 11B supported by the cushioning members 10A and 10B within a required range.

The cloth members 11A and 11B may have mesh-shaped gaps. In this case, solder enters the mesh-shaped gaps when the terminal electrodes 7A and 7B of the electronic component 2 are joined to the cloth members 11A and 11B and connectivity can be improved as a result. In addition, when the cloth members 11A and 11B are joined to the cushioning members 10A and 10B by thermocompression bonding, the cloth members 11A and 11B and the cushioning members 10A and 10B can be firmly joined by the molten cushioning members 10A and 10B entering the mesh-shaped gaps. In addition, heat can be easily transferred to the cloth members 11A and 11B, and thus the joining between the cloth members 11A and 11B and the cushioning members 10A and 10B is facilitated.

The method for producing the metal terminal-equipped electronic component 1 according to the present embodiment has Step S10 of preparing the electronic component 2 having the terminal electrodes 7A and 7B, Step S20 of preparing the conductive cloth members 11A and 11B to be joined to the terminal electrodes 7A and 7B as the metal terminals 3A and 3B, Step S30 of preparing the cushioning members 10A and 10B supporting the electronic component 2 and the cloth members 11A and 11B, Step S40 of joining the cloth members 11A and 11B by thermocompression bonding to at least the mounting surfaces 10d of the cushioning members 10A and 10B and the joint surfaces 10c of the cushioning members 10A and 10B to which the electronic component 2 is joined, and Step S50 of joining the terminal electrodes 7A and 7B of the electronic component 2 to the cloth members 11A and 11B on the joint surfaces 10c of the cushioning members 10A and 10B.

According to the method for producing the metal terminal-equipped electronic component 1 according to the present embodiment, it is possible to improve the deflection resistance of the metal terminal-equipped electronic component 1 using the same action and effect as those of the metal terminal-equipped electronic component 1 described above. In addition, the cloth members 11A and 11B are joined by thermocompression bonding to the cushioning members 10A and 10B in Step S40 of joining the cloth members 11A and 11B to the cushioning members 10A and 10B. In this case, the molten material of the cushioning members 10A and 10B enter the cloth members 11A and 11B and the two can be firmly joined as a result. In addition, although the flexibility of the cloth members 11A and 11B is impaired at the solder part in a case where solidifying solder is used, the cloth members 11A and 11B and the cushioning members 10A and 10B can be joined by thermocompression bonding and without solder being used, and thus it is possible to maintain a state where the cloth members 11A and 11B exhibit flexibility and the deflection resistance can be improved.

The present disclosure is not limited to the embodiment described above.

Figure 4A:
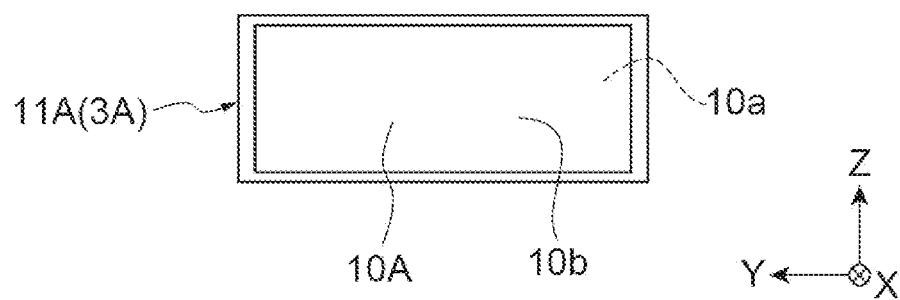
FIGS. 4A and 4B are diagrams illustrating modes of joining the cloth member to the cushioning member in metal terminal-equipped electronic components according to modification examples.

For example, the joining mode of the cloth members 11A and 11B is not particularly limited with respect to the cushioning members 10A and 10B and any joining mode can be adopted insofar as electrical connectivity is ensured between the terminal electrodes 7A and 7B and the terminals of the substrate. For example, as illustrated in FIG. 4A, the cloth member 11A may surround the cushioning member 10A in a square cross section when viewed from the X-axis direction. The side surfaces 10a and 10b on both sides in the X-axis direction are not covered with the cloth member 11A. In this case, the cloth member 11A is supported in a state where the cushioning member 10A is wrapped around the entire circumference when viewed from the X-axis direction, and thus electrical conductivity can be ensured with greater reliability. For example, although the stress attributable to deflection easily has an effect in a case where a metal piece surrounds the entire circumference of the cushioning member 10A, the cloth member 11A has flexibility, and thus it is possible to improve the deflection resistance while ensuring the electrical conductivity.

Figure 4B:
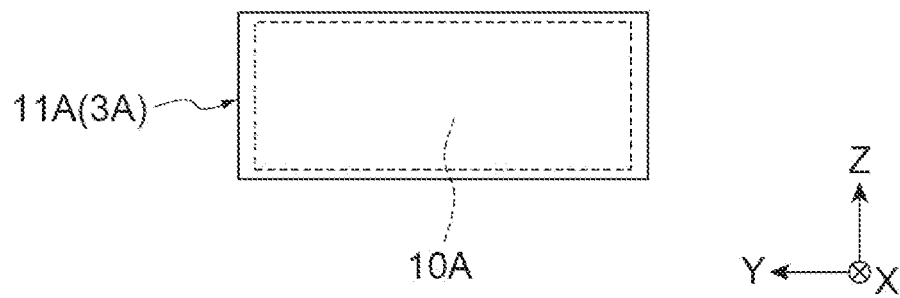

Although the side surfaces 10a and 10b on both sides in the X-axis direction are not covered with the cloth member 11A in the connection mode illustrated in FIG. 4A, the cloth member 11A may cover the six surfaces of the cushioning member 10A without exception as illustrated in FIG. 4B.

Although the pair of cushioning members 10A and 10B separated from each other are adopted in the embodiment described above, a configuration in which an integrated cushioning member supports the terminal electrodes 7A and 7B at the same time may be adopted instead.

REFERENCE SIGNS LIST

1: metal terminal-equipped electronic component, 2: electronic component, 3A, 3B: metal terminal, 7A, 7B: terminal electrode, 10A, 10B: cushioning member, 11A, 11B: cloth member.

What is claimed is:

1. A metal terminal-equipped electronic component comprising:
   an electronic component having a terminal electrode;
   a conductive cloth member joined to the terminal electrode as a metal terminal; and
   a cushioning member supporting the electronic component and the cloth member, wherein
   the cloth member is joined to at least a mounting surface of the cushioning member and a joint surface of the cushioning member to which the electronic component is joined, and
   the terminal electrode of the electronic component is joined to the cloth member on the joint surface of the cushioning member.

2. The metal terminal-equipped electronic component according to claim 1, wherein the cushioning members are separated from each other as a pair of members.

3. The metal terminal-equipped electronic component according to claim 1, wherein the cloth member is joined so as to bite into the cushioning member.

4. The metal terminal-equipped electronic component according to claim 1, wherein the cloth member surrounds the cushioning member in a U-shaped cross section when viewed from a direction parallel to the mounting surface.

5. The metal terminal-equipped electronic component according to claim 1, wherein the cloth member surrounds the cushioning member in a square cross section when viewed from a direction parallel to the mounting surface.

6. The metal terminal-equipped electronic component according to claim 1, wherein the cloth member has a mesh-shaped gap.

* * * * *